March 5, 1929.  W. F. CHADBOURNE  1,704,172
CROSS CHAIN SNAP-ON CLIP
Filed March 27, 1928

INVENTOR_
Weston F. Chadbourne.
by H. W. Kenway,
Atty

Patented Mar. 5, 1929.

1,704,172

UNITED STATES PATENT OFFICE.

WESTON F. CHADBOURNE, OF FRANKLIN, MASSACHUSETTS.

CROSS-CHAIN SNAP-ON CLIP.

Application filed March 27, 1928. Serial No. 264,986.

This invention relates to anti-skid chains for use upon the wheels of motor vehicles. Its object is to provide a snap-on clip which may be used detachably in connection with cross chains so that the latter may be readily replaced when worn or broken, or new cross chains adapted for connection to the side chains, without the necessity of using special tools.

The type of cross chain to which the present invention particularly relates is that having at either end a double hook link, that is to say, a link formed of heavy wire doubled upon itself to form two side strands, the ends of which are curved upwardly to form the bill of the hook. The attempt has been made heretofore to design a detachable clip to be secured to the hook link by some form of connection with both side strands thereof. Under conditions of severe usage, such clips have not hitherto proved to be reliable and my discovery of the cause of their failure is the basis of the present invention. I have found that when a cross chain is dragged with a locked wheel upon the ground, the double hook link is distorted in its shape, either by the twisting of one strand with respect to the other or by the closing or opening of the two side strands with respect to each other. The result is that any clip depending for its attachment on engagement with both strands is distorted and strained, so that it becomes detached. In one of its aspects, therefore, the present invention consists in a cross chain clip constructed and arranged to engage one side strand only of a double hook line, thus securing the clip in place while leaving the body thereof free to float upon the other strand of the hook link. Under these conditions, distortion or deformation of the hook link, which does not take place within a single strand but only in the relative displacement of the two strands, does not affect the security of the clip.

In double hook links as now constructed, the two side strands are usually spaced a short distance apart in the bill of the hook. An important feature of the invention consists in a detachable clip having a strand-spacing portion constructed and arranged to be inserted between the side strands of the hook link, so as to act as a spacer for these portions of the hook and positively prevent them from being closed together under any conditions where the link is subjected to side pressure. Such a portion of the clip is useful not only in preserving the shape of the hook link but also in anchoring the clip in place and preventing angular displacement thereof upon the link.

These and other features of the invention will be best understood and appreciated from the following description of a preferred embodiment thereof, selected for purposes of illustration and shown in the accompanying drawings, in which Fig. 1 is a view in front elevation of a portion of a cross chain equipped with a clip of my invention, shown as connected to a side chain;

Figure 1:
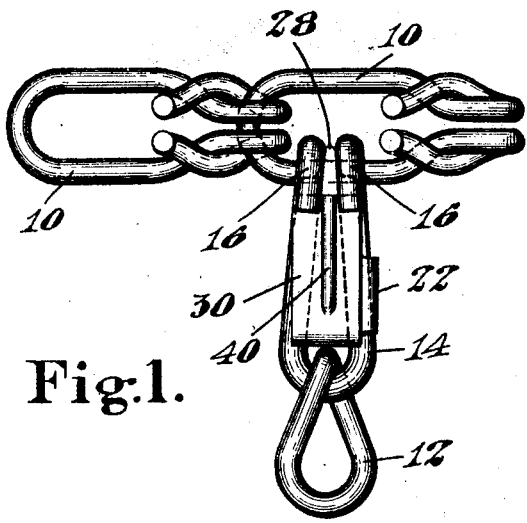
Figure 2:
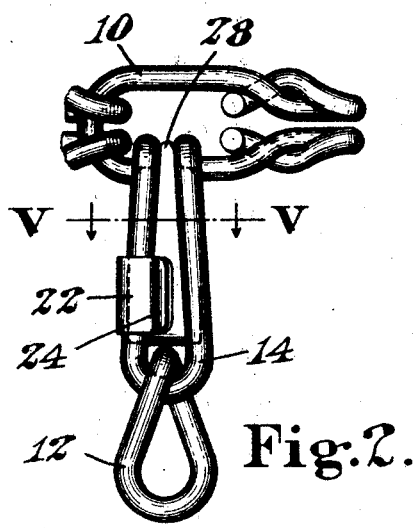
Fig. 2 is a similar view in rear elevation.
Figure 3:
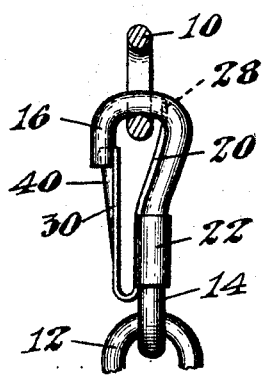
Fig. 3 is a similar view in side elevation.

The cross chain comprises the intermediate links 12 and has at each end a connecting link 14 formed of a single length of heavy steel wire folded upon itself to form two side strands and then bent upwardly so that the upturned ends 16 form a double bill. The two side strands of the double hook converge slightly toward the bill end and bend downwardly in approaching the curve of the bill. The side chains comprise the connected links 10 and the cross chains extend between these links at regular spacing. As herein shown, the bill of the double hook connecting link is left open sufficiently to receive one strand of the side chain link 10. The snap-on clip of my invention serves to prevent disengagement of the hook of the cross chain from the side chain.

Figure 4:
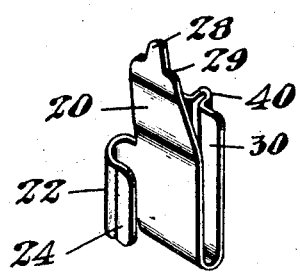
Fig. 4 is a view in perspective of a clip.

The construction of the clip is best shown in Fig. 4. It constitutes an integral sheet metal structure fashioned from a flat blank of sheet steel. The body portion 20 of the clip is elongated and shaped in general to coincide with the contour of the two side strands of the double hook link. At one edge, it is provided with a transversely extending lip which is folded under the body portion and curved to form a strand-embracing clasp designed to fit upon one side strand of the double hook and to extend about it for more than 180 degrees. The outer edge of the lip is flared from the body portion of the clip to facilitate being slipped upon one strand of the double hook link, the whole clip being formed of resilient material, as will be understood.

Except for the curved lip 22, the under side of the body 20 of the clip is smooth, so that as a whole it lies upon the strands of the double hook link and is free to float thereon, that is to say, the two strands may be closed together or separated without in any way affecting the engagement of the clip and even relative angular displacement of the two strands has no more effect than slightly to turn the clip on the strand to which it is secured.

The body portion 20 of the clip is bent transversely to follow the contour of the side strands of the double hook and is reduced at its forward end to form a tongue 28 flanked by shoulders 29. The proportions of the clip are such that the reduced tongue 28 is located between the upturned ends of the bill of the double hook link at a point adjacent to the base thereof or where the upward curvature begins, and the shoulders 29 fit snugly against the inner surfaces of the strands of the bill. In this way, the clip is anchored positively against angular displacement upon the double hook link, while at the same time the tongue 28 acts as a spacer to prevent positively closing in the upturned strands of the hook.

From the rear edge of the body 20 of the clip, an integral tongue 30 extends upwardly and forwardly above the body portion 20 and in spaced relation to the latter. The tongue is provided with a longitudinally extending rib 40 formed by a corrugation in the material thereof which acts to stiffen and strengthen the tongue without interfering with its resiliency. This tongue terminates at its free end in a position adjacent to the ends 16 of the double hook link and substantially in engagement with their under surfaces. When the clip is in position, therefore, the tongue 30 closes the opening of the hook and retains the side of the link against removal, while the rib 40 acts as a spacer between the ends of the bill of the hook.

It will be apparent that the clip may be assembled upon the hook link of the cross chain by first locating the tongue 28 in a position between the upturned strands of the hook and then swinging the clip transversely to spring the strand-embracing clasp 22 over one of the side strands of the hook. The clip may be removed from the hook link by a reverse operation and it may be convenient to assist this by inserting a screw driver under the lip 24.

Figures 5, 6:
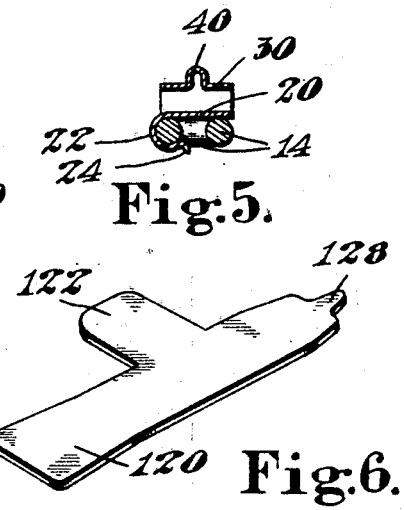
Fig. 5 is a view in cross section on the line 5—5 of Fig. 2.
Fig. 6 is a view in perspective of the blank used in producing the clip.

The clip herein described may be produced with good advantage from a flat blank such as that shown in Fig. 6. This comprises a flat body portion 120 with rounded corners and having one end reduced by successive pairs of shoulders to form the reduced tongue 128. The other end of the blank is widened with flaring edges to furnish material for the corrugation 40 which, when formed, draws in the edges of the blank so that they are substantially parallel throughout the length of the clip. From one side of the blank extends transversely a lip 122 which, in the finished clip, is folded under to form the strand-embracing clasp. The blank shown in Fig. 6 is fashioned into the clip shown in Fig. 4 by first forming the corrugation 40, then bending the lip 122 downwardly and under the body portion, and finally bending the rear portion of the blank upwardly and forwardly so as to form the tongue 30 of the completed clip.

Figure 7:
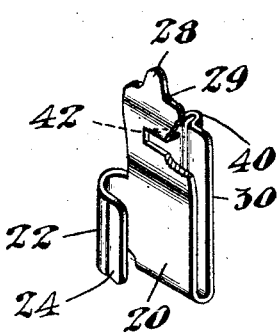
Fig. 7 is a view in perspective of a clip of modified construction.

A clip of modified construction is shown in Fig. 7. This differs from that already described in that the body portion 20 is provided with an upwardly extending lip 42 formed of material struck upwardly from the body portion 20. The function of this lip in the completed clip is to prevent the side strand of the link 10 of the side chain from being displaced rearwardly in the opening of the hook and to preserve the links of the chain structure in their working relation.

The clip shown in Fig. 7 possesses the same advantages of easy attachment to the cross chain and permits the same ready attachment and detachment of a cross chain so equipped.

It will be apparent that the clip herein shown may be used with any cross chain where the opening of the bill equals substantially the diameter of the side chain strand. It is not necessary, therefore, that all cross chains should be equipped with the clip, for the latter may be assembled whenever required upon any cross chain of which service is desired. In disengaging a cross chain, it will be understood that the tongue 30 is merely depressed sufficiently to permit the strand of the side chain 10 to be passed out under the bill of the hook and when pressure on the tongue 30 is released, the hook is immediately closed.

Having thus described my invention, what I claim as new and desire to secure by Letters Patent is:

1. A cross chain clip, comprising an integral sheet metal body portion having one edge curved to embrace a single strand of a double hook link and secure the clip to the link independently of the other strand, and a resilient tongue projecting from the body of the clip into proximity to the bill of the hook link.

2. A cross chain clip, comprising an integral sheet metal body portion having a transversely extending lip at one edge curved to embrace a single strand of a double hook link about more than 180 degrees of its circumference thus securing the clip to the link independently of the other strand, and a resilient tongue projecting from the body of the clip into the opening of the bill.

3. A cross chain clip, comprising an integral sheet metal body portion formed with resilient means for embracing and securing the clip to one side strand only of a double hook link leaving the body of the clip free to float upon the other strand thereof, and a curved tongue projecting into the hook opening.

4. A cross chain clip, comprising an elongated sheet metal body portion formed with a resilient curved flange having its edge flared outwardly to facilitate the entrance of a single strand of a double hook link and being flat in other parts so as to float freely upon the other strand of the hook, and a resilient tongue projecting into the hook opening.

5. A cross chain clip, comprising an elongated sheet metal body portion having a transversely extending lip folded under one edge thereof to form a curved snap-on clasp for engaging one strand of a double hook link and being otherwise flat and smooth so as to float freely upon the other strand of the hook, said body portion merging at one end into an upwardly and forwardly extending tongue.

6. A snap-on clip for a cross chain, comprising an elongated sheet metal body portion shaped to lie upon and conform to the two strands of a double hook link, being curved at one edge only to embrace one strand and having a reduced tongue at its forward end disposed between the strands at the base of the bill curvature, and having its rear portion folded forwardly in the form of an overlying tongue.

7. A snap-on clip for cross chains, comprising an elongated body portion of sheet metal shaped to lie upon the two strands of a double hook link, following said strands in contour and being reduced at its forward end to extend between the upwardly curved strands of the bill and to form a positive stationary spacer therefor, said body having a resilient snap-on clasp at one edge only and merging at its rear end into an upwardly and forwardly extending tongue.

8. A snap-on clip for cross chains, comprising an elongated body portion of sheet metal shaped to lie upon the two strands of a double hook link, being extended at its forward end to lie between the upstanding strands of the bill and so prevent angular displacement of the clip, having at one edge only a curved strand-embracing flange, and merging at its rear end into a superposed tongue.

9. A snap-on clip for cross chains, comprising a sheet metal body portion shaped to lie upon the two strands of a double hook link, having at one edge only a curved strand-embracing flange, and having a tongue extending forwardly into proximity to the bill of the hook, said tongue having a longitudinally disposed corrugation therein arranged to lie between the ends of the bill and act as a spacer.

10. A snap-on clip for cross chains, comprising a sheet metal body portion having at one edge only a strand-embracing flange, a longitudinally corrugated tongue extending forwardly from the rear edge of said body portion, and a lip struck up from said body portion at a point substantially opposite the end of the tongue.

11. A flat sheet metal blank for a snap-on clip comprising an elongated body portion shouldered at one end to form a tongue and widened with flaring walls at its other end, and a lip extending transversely from one edge.

WESTON F. CHADBOURNE.